United States Patent [19]

White

[11] Patent Number: 5,328,003

[45] Date of Patent: Jul. 12, 1994

[54] BRAKE SPRING RETENTION SYSTEM FOR A CAST BRAKE SHOE

[75] Inventor: Jay D. White, Galesburg, Mich.

[73] Assignee: Eaton Corporation, Cleveland, Ohio

[21] Appl. No.: 952,030

[22] Filed: Sep. 28, 1992

[51] Int. Cl.$^5$ ............................................. F16D 51/22
[52] U.S. Cl. ............................. 188/250 F; 188/250 D; 188/340; 188/250 C
[58] Field of Search ............... 188/325, 340, 166, 361, 188/250 B, 250 H, 250 R, 250 D, 250 F, 250 E, 329, 341, 250 C

[56] References Cited

U.S. PATENT DOCUMENTS

| 870,666 | 11/1907 | Cookingham | 188/250 R |
| 1,977,916 | 10/1934 | Nelson | 188/250 D |
| 2,048,433 | 7/1936 | Delahaye | 188/250 H |
| 4,151,901 | 5/1979 | Parfitt | 188/250 F |
| 4,936,426 | 6/1990 | Chatman et al. | 188/250 F |

Primary Examiner—Matthew C. Graham
Attorney, Agent, or Firm—Loren H. Uthoff, Jr.; Howard D. Gordon

[57] ABSTRACT

A brake return spring retention system for a cast brake shoe where a slot is located on the inside rib of the brake shoe having a width which exceeds that of a spring hook formed on one end of a brake return spring where the spring hook passes into the slot and engages a spring retention pin which is positioned transverse to the slot.

6 Claims, 2 Drawing Sheets

FIG I

FIG 2
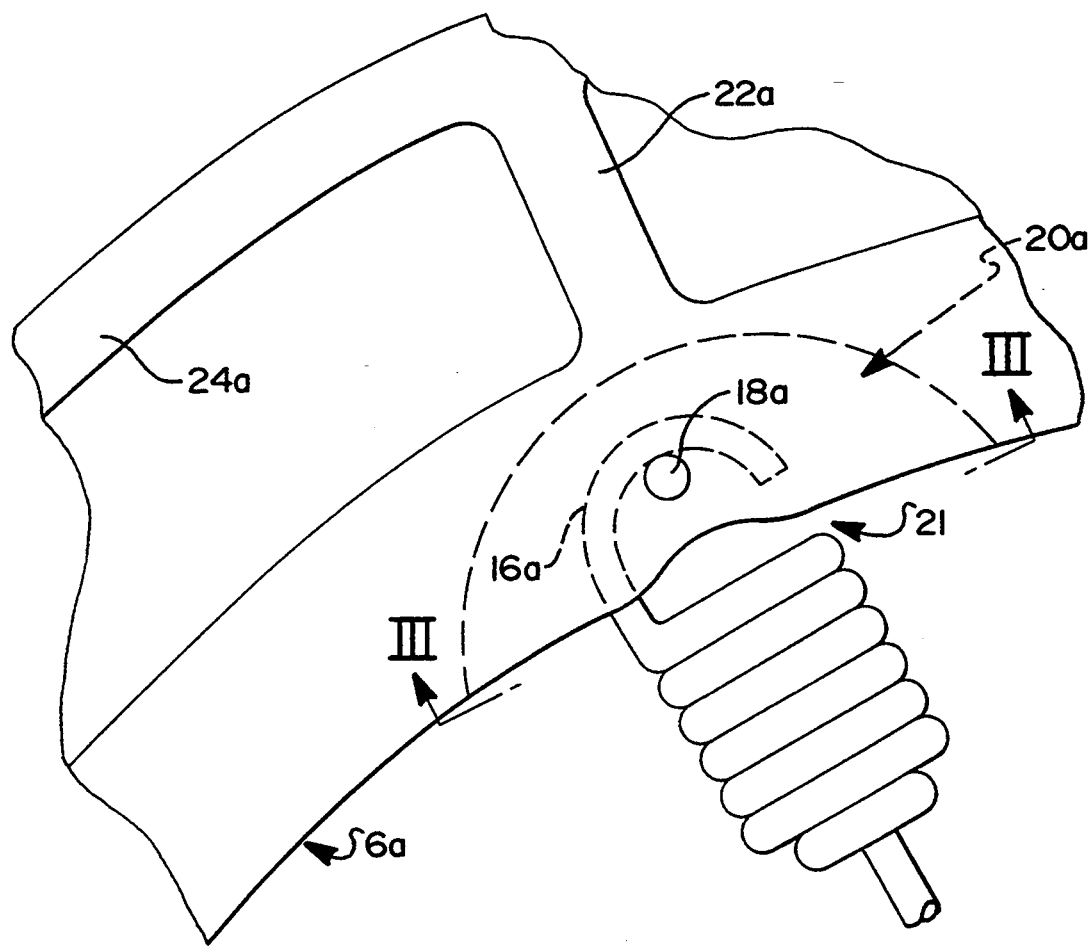
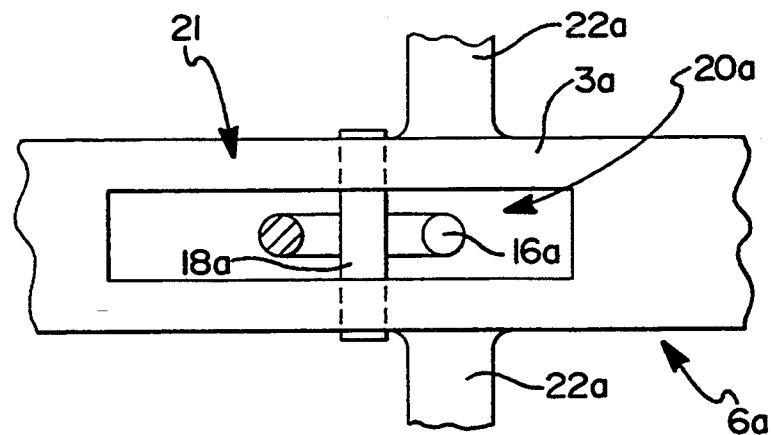
FIG 3

BRAKE SPRING RETENTION SYSTEM FOR A CAST BRAKE SHOE

FIELD OF THE INVENTION

This invention relates to a brake return spring retention method. More specifically, this invention relates to a brake return spring retention method for use with a cast brake shoe where a portion of the brake shoe is removed to allow for placement of a support pin and clearance for a brake spring hook which engages the support pin.

DESCRIPTION OF THE PRIOR ART

Drum and shoe brake systems are well known in the art of braking motor vehicle wheels. Such systems characteristically include a stationary brake housing or torque plate secured to the end of the axle about which rotates a rotary drum to which the wheel is secured. The brake system features a pair of opposed brake shoe assemblies that are respectively pivotally mounted at one end to the brake housing within the drum and carry frictional brake pads facing theretoward. Upon application of the brakes, a mechanism such as a rotary or a wedge cam disposed between the opposite ends of the brake shoe assemblies, is caused to rotate or to be axially displaced and spread the brake shoe assemblies apart for a distance sufficient to enable the brake pad to frictionally engage the drum for the backing thereof.

Prior art brake systems have been designed to utilize a brake return spring which serves to force a leading and a lagging brake shoe toward the centroid of a vehicle axle thereby providing for clearance between the brake shoes and the inside of a brake drum when in a non-energized state. Upon energizing the brake unit, both the leading and the lagging brake shoes are forced outward using the actuation means thereby extending the brake return spring so that the brake shoes contact the inside of the brake drum thereby providing for frictional generation of a force acting to slow the vehicle.

Traditionally, due to the design and geometry of the wheel and the brake, there has been ample clearance between the brake return spring support pin and the inside face of the brake shoe to allow for easy assembly of the brake unit and specifically, the placement of the brake spring hook onto the spring support pin or into a hole formed in the shoe. It is common to use steel stampings fabricated to form a brake shoe which contains either holes drilled in the surface or support pins which protrude from and are secured to the shoe for attachment of the brake return spring.

When a vehicle is subjected to extreme heavy duty load conditions, a cast metal brake shoe is desirable in order to obtain the required rigidity and durability as opposed to the commonly used shoe fabricated from steel stampings. Unfortunately, the cast shoe is larger and takes up increased space at the interior of the brake shoe assembly specifically when the brake return spring is packaged. The decreased space requires that the brake return spring be limited in overall length to clear the actuation means, especially if an S-cam actuator is used such as that disclosed in U.S. Pat. No. 4,476,968. It becomes difficult to obtain the necessary spring constricting force which draws the brake shoes inward while concurrently allowing for the required range of motion of the shoes and brake return spring without overstressing the spring as the shoes are expanded to contact the inside of the brake drum.

To facilitate the fitting of a return spring having the required spring characteristics, it is necessary to decrease the overall length while increasing the number of active spring coils to minimize the induced stress experienced in the spring upon energizing the brake and stretching the spring. The increased overall length of the spring creates problems with clearance between the spring and the actuation method and requires the spring support pins to be located at a distance exceeding the separation distance between the brake shoes. This requirement results in positioning of the spring support pin on the shoe itself.

Difficulties arise when a cast brake shoe is used where the construction material is no longer made from steel stampings but rather from a metal casting. With a cast brake shoe, the brake spring anchor pins can no longer be easily attached to the face nor can a simple hole be drilled for attachment of the brake return spring hook due to the nature of the spring and the thickness of the cast shoe. Thus, there is difficulty in attaching the brake return spring to a brake shoe that has been fabricated from a metal casting in that prior art methods of brake return spring retention are unsuitable due to the shoe thickness and the rib supports.

SUMMARY OF THE INVENTION

The present invention allows for the use of a cast metal brake shoe where the return spring support pins are placed within a slot like cavity formed on the inside portion of the brake shoe allowing for the use of a brake return spring having a length sufficient for clearance from the actuation means while limiting stresses to an acceptable level upon full extension of the spring. The present invention also provides for the secure anchoring of the brake return spring support pins where the forces generated by the spring are shared equally by either side of the clearance slot formed in the shoe. By using the slot which is formed on the inside portion of the shoe, the return spring can be easily fitted where the return spring hook is directed into the slot and over the spring support pin for retention thereon.

One provision of the present invention is to provide a secure attachment for a brake return spring to a cast brake shoe.

Another provision of the present invention is to provide for the retention of a brake return spring with the required spring coils for controlling the internal stresses of the spring upon extension.

Still another provision of the present invention is to allow for ease of assembly of a brake return spring onto a support pin located and supported by both sides of a slot formed in a cast brake shoe.

BRIEF DESCRIPTION OF THE DRAWINGS

FIG. 2 is a cross-sectional view of a portion of the brake assembly of the present invention; and FIG. 3 is a sectional view 3—3 of the portion of the brake assembly of the present invention as shown in FIG. 2.

DETAILED DESCRIPTION OF THE PREFERRED EMBODIMENT

Figure 1:
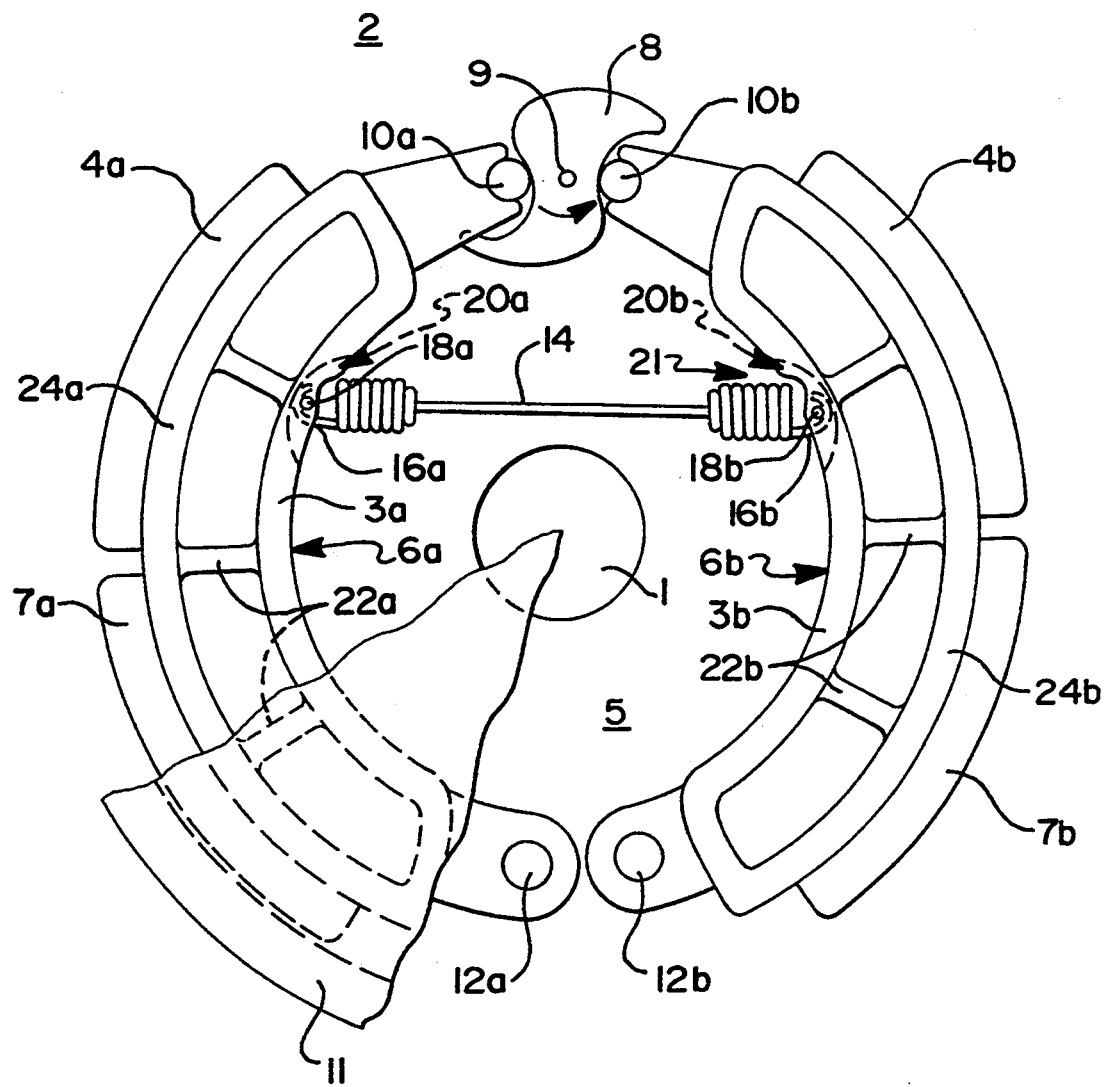
FIG. 1 is a cross-sectional view of a brake assembly of the present invention.

Now referring to FIG. 1, a cross-section view of the brake assembly 2 of the present invention is shown mounted so as to encircle the vehicle axle 1 which rotates with an attached brake drum 11 (only a portion of which is shown) and a wheel and tire assembly which is not shown. The brake assembly 2 is mounted to a brake housing 5 which is secured to a vehicle axle housing (not shown) which rotatably supports the vehicle axle 1. The brake assembly 2 includes a left brake 7a and a right brake 7b which are made up of a left brake pad 4a and a right brake pad 4b mounted to a left brake shoe 6a and a right brake shoe 6b respectively. The left brake shoe 6a and the right brake shoe 6b are pivotedly mounted to the brake housing 5 which is mounted to the vehicle axle housing (not shown). The upper end of the left brake shoe 6a and the upper end of the right brake shoe 6b ride against a cam actuator 8 which can be a variety of actuating type systems such as a hydraulic cylinder or an "S-cam" which rotates and uses the shape of a cam element to separate the brake shoes 6a and 6b. The structure and operation of a brake assembly employing an "S-cam" actuator is disclosed in U.S. Pat. No. 4,476,968, the disclosure of which is hereby incorporated by reference.

The lower end of the left brake shoe 6a and the right brake shoe 6b are pivotedly mounted to the brake housing 5 with the left anchor pin 12a and the right anchor pin 12b respectively. In the alternative, a single anchor pin can be used to pivotly mount both the left brake shoe 6a and the right brake shoe 6b. The brake return spring 14 is attached to the left brake shoe 6a and the right brake shoe 6b imparting a force therebetween tending to draw the two shoes toward the axle 1 centerline. The brake return spring 14 includes a left spring hook 16a which engages a left spring pin 18a which is mounted to the rib section 3a of left brake shoe 6a. In a like manner, the brake return spring 14 also includes a right brake spring hook 16b which engages a right spring pin 18b mounted to the rib section 3b of right brake shoe 6b. To provide for clearance between the left spring hook 16a, a cavity known as a left spring slot 20a is formed in the left brake shoe 6a and in a like manner, a right spring slot 20b is formed in the right brake shoe 6b to provide clearance for the right spring hook 16b. The slots 20a and 20b are approximately centered in the rib sections 3a and 3b of brake shoes 6a and 6b respectively.

Upon activation of the brake assembly 2 the cam actuator 8 which is rotated about its center 9 contacts and moves left roller 10a away from right roller 10b thereby increasing the distance between the left brake 7a and the right brake 7b so that the left brake pad 4a and the right brake pad 4b are increased in separation and contact a brake drum 11 which is attached to and rotates with the vehicle axle 1. This separation movement thereby results in contact between the brake drum 11 and the left brake pad 4a and the right brake pad 4b producing frictional forces which act to slow the brake drum 11 which is attached to the wheel and tire thereby retarding the motion of the vehicle.

The left brake shoe 6a includes left shoe webbing 22a which in turn is joined to and supports the left shoe face 24a upon which a left brake pad 4a is mounted. In a like manner, the right brake shoe 6b supports and is connected by the right shoe webbing 22b to the right shoe face 24b which mounts and secures the right brake pad 4b.

Now referring to FIG. 2, an exploded view of a section of the brake assembly 2 as shown in FIG. 1 is shown to more clearly illustrate the engagement of the left spring hook 16a with the left spring pin 18a. The left brake shoe 6a is shown which includes a left spring slot 20a formed in the rib section 3a of the left brake shoe 6a where a left spring pin 18a is secured in and surrounded by the material of the rib section 3a. The purpose of the left spring pin 18a is for engagement by the left spring hook 16a for securing the brake return spring 14 which in turn extends and engages the right brake 7b by the right spring pin 18b located within the rib section 3b of the right brake shoe 6b. The left spring slot 20a is shaped to allow for the left spring hook 16a to be engaged or disengaged from the left spring pin 18a and the right spring slot 20b is shaped to allow for the right spring hook 16b to be engaged or disengaged from the right spring pin 18b.

Now referring to FIG. 3, a sectional view of section 3—3 is shown to better illustrate the function of the left spring slot 20a which is a cavity or void in the rib section 3a of the left brake shoe 6a and provides for clearance for the left spring hook 16a to partially encircle the left spring pin 18a. The left spring slot 20a is approximately centered in the rib section 3a of the left brake shoe 6a where the centerline of the left spring slot 20a lies along the centerline of the left brake shoe 6a. The axis of the left spring pin 18a is approximately perpendicular to the axis of the left brake shoe 6a and the left spring slot 20a and is pressed into a hole formed in the left brake shoe 6a bridging the sides of the left spring slot 20a.

As an alternative, the left spring pin 18a could be formed by casting a suitable shape which could be similar to that of the spring pin but with a slightly larger diameter into the left brake shoe 6a. The left shoe webbing 22a extends outward from the main section of the left brake shoe 6a to be joined to the left shoe face 24a. Also shown in both FIGS. 2 and 3 are a brake shoe relief 21 which functions to allow for increased clearance between the brake return spring 14 and the left brake shoe 6a and in a similar manner, the right brake shoe 6b.

All references made herein to the left brake 7a and elements associated therewith apply equally in a similar manner to the right brake 7b and its associated elements.

Although the present invention has herein been described with respect to the illustrated embodiment, it will be understood that the invention is capable of modification and variation, which will be encompassed by the scope of the following claims.

What is claimed is:

1. A brake spring retention system for a drum brake comprising:

a brake shoe fabricated casting a metal material and having a single rib section, said brake shoe having a friction surface for generating a braking force, said rib section located on the opposite side of said brake shoe as said friction surface and having a spring slot formed therein, said spring slot having an opening facing in a direction opposite to said friction surface;

a brake drum for frictionally reacting signal said friction surface;

a spring retention pin secured in said rib section transverse to said slot;

a brake spring having a spring hook for anchoring said brake spring to said brake shoe where said spring hook engages said spring retention pin thereby applying a force tending to retract said brake shoe friction surface away from said brake drum; and wherein said spring slot extends from slightly above said spring retention pin to slightly below said spring retention pin sufficiently to permit installation and removal of said spring hook.

2. The brake spring retension system of claim 1, wherein said spring retension pin is formed in said brake shoe casting.

3. The brake spring retention system of claim 1, wherein said rib section has a recessed portion for providing clearance from said brake spring.

4. A brake spring retention system for a brake assembly which brakes a rotating drum comprising:

a stationary brake housing;

a pair of opposed cast brake shoes respectively having first and second ends and first and second sides with said first end pivotally secured to said brake housing, said first side of said brake shoe carrying a frictional brake pad for reacting against said rotating drum when braking is desired, said brake shoe having only one rib section with a slot formed therein, said slot having an opening facing opposite said brake pad;

a spring support pin mounted to said brake shoe transverse to said slot;

a cam disposed between said second ends of the brake shoes, said cam mounted on a rotary shaft and operative to rotate thereby acting against said second ends and urge said brake shoes away from each other and cause the brake pad to engage the drum upon actuation of said brake assembly; and spring means respectively having one end secured to each of said brake shoes by engaging said spring support pin after passing through said slot, said spring means acting on said brake shoes thereby urging said brake shoes toward each other upon release of said brake assembly.

5. The brake spring retention system of claim 4, wherein said spring support pin is pressed into said brake shoe having a plurality of holes therein and transversing said slot.

6. The brake spring retention system of claim 4, wherein said spring support pin is formed in said brake shoe transverse to said slot.

* * * * *